US005565935A

United States Patent [19]
Miura et al.

[11] Patent Number: 5,565,935
[45] Date of Patent: Oct. 15, 1996

[54] DATA COPYING DEVICE FOR A CAMERA

[75] Inventors: Kosho Miura, Kanagawa-ken; Tetsuro Goto, Chiba-ken, both of Japan

[73] Assignee: Nikon Corporation, Tokyo, Japan

[21] Appl. No.: 353,284

[22] Filed: Dec. 5, 1994

[30]     Foreign Application Priority Data

Dec. 20, 1993   [JP]   Japan .................................. 5-319694

[51] Int. Cl.⁶ .................................................. G03B 17/24
[52] U.S. Cl. ............................................ 396/310; 396/292
[58] Field of Search ................................... 354/105, 106, 354/289.1, 289.11, 289.12, 474, 475

[56]              References Cited

U.S. PATENT DOCUMENTS

| | | | |
|---|---|---|---|
| 4,812,871 | 3/1989 | Taniguchi et al. | 354/106 X |
| 4,862,201 | 8/1989 | Taniguchi et al. | 354/106 |
| 4,958,174 | 9/1990 | Goto et al. | 354/106 |
| 5,245,373 | 9/1993 | Ogawa et al. | 354/106 |

Primary Examiner—A. A. Mathews
Attorney, Agent, or Firm—Oliff & Berridge

[57]            ABSTRACT

Data positions and character orientations are quickly and reliably determined by a data copying device of a camera. Data relating to photography such as date and time, exposure value, and the like is copied inside or in the vicinity of a photographic field of a film.

18 Claims, 10 Drawing Sheets

DATA COPYING DEVICE FOR A CAMERA

BACKGROUND OF THE INVENTION

1. Field of the Invention

The present invention relates to a data copying device for a camera that copies data pertaining to photography, such as date/time, exposure value, and the like, within the photographic field or in the vicinity thereof.

2. Background of the Invention

Data copying devices are currently known, such as that disclosed in Japanese unexamined patent application Hei 2-71234, which copy data pertaining to photography, such as date/time, exposure value, and the like, within the photographic field or in the vicinity thereof.

FIG. 13 shows the data copying device introduced in the above Japanese unexamined patent application. This data copying device is capable of copying data in a total of two places; inside and outside of the photographic field of one camera frame. Data copied is displayed on copying data display components.

Each data setting is carried out in the following manner: after a photographic field exterior or interior has been selected by a function selection button, data classifications such as the year/month/day, hour/minute/second, and the like are selected by a mode selection button, and revision of each column is made possible by a numerical value selection button. The current numerical value is increased or decreased by an up button or a down button and revised to the desired numerical value.

After such an operation is repeated and the desired numerical values have been set for the two copying data display components a copying mode is activated when a print button is depressed. A "print" mark on the display component is then illuminated.

If copying data is desired in only one area, when data classification is selected by the mode selection button, one of the copying data display components for which copying will not be performed is set to a blank condition.

After this type of condition is set, a subject image is exposed by performing photography and simultaneously the data copying recording is carried out.

However, with conventional data copying devices, it is extremely difficult to determine which data has been selected.

In addition, in the case of a data copying device that copies between adjoining photographic fields, or so-called frames, it is difficult to determine which field the copied data corresponds to.

Furthermore, in so-called vertical position photography in which photography is performed with a camera held in the vertical position, since some people position a shutter button of the camera at the top and some people position the shutter button at the bottom, characters are sometimes copied in reverse from the true position of the photographic image. There is also a danger of misinterpreting characters such as 0, 1, or 8, for which it is difficult to distinguish the correct orientation.

SUMMARY OF THE INVENTION

The present invention is directed at resolving problems associated with conventional devices of this type.

It is an object of the present invention to provide a data copying device for a camera that can promptly and reliably allow one to know the copying position and character orientation of copied data.

A data copying device according to one embodiment of the present invention comprises primary recording device capable of copying primary data within a photographic field or in the vicinity of the photographic field of a film; a secondary recording device capable of recording secondary data within the photographic field or in the vicinity of the photographic field in a different position from the recorded position of the primary data; a display device positioned on the camera and externally visible to a user of the camera. The display device comprises a photographic field display component having a form that roughly corresponds to the photographic field, and primary and secondary recording position display components that show the relative positions of the primary and secondary data recording positions for the photographic field. In other words, the primary and secondary display components are arranged on the photographic field display component approximately the same way that the primary and secondary recording devices are arranged with respect to a photographic field of the film.

The recording position of the primary and secondary data copied to the photographic field is displayed on the primary and secondary recording position display components roughly according to their relative positions with respect to the photographic surface.

A data copying device according to another embodiment of the present invention comprises a primary recording device capable of recording primary data within a photographic field or in the vicinity of the photographic field of the film; a secondary recording device capable of recording secondary data within the photographic field or in the vicinity of the photographic field in a different position from the recorded position of the primary data; a display device positioned on the camera and externally visible to the camera user, and primary and secondary recording direction display components, provided within the display device, to show orientation of characters of the primary and secondary data to be copied by the primary and secondary recording devices.

The character orientation of the primary and secondary data that is copied to the photographic field is displayed on the primary and secondary recording direction display components.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
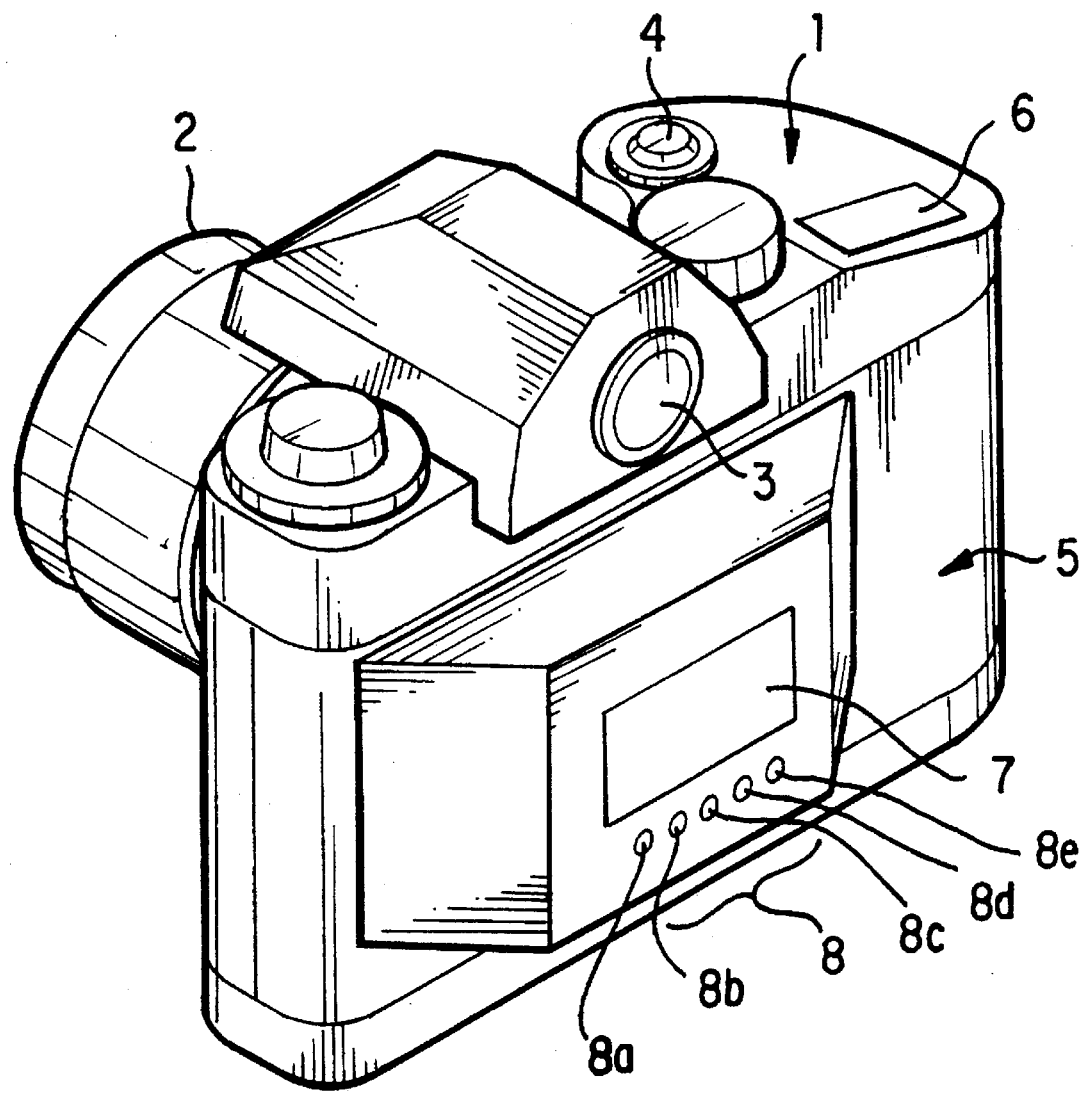
FIG. 1 is an oblique view showing a camera onto which an embodiment of the data copying device of the present invention is installed.

An embodiment of the present invention is described below in which FIG. 1 shows a camera 1 equipped with one embodiment of the data copying device according to the present invention. With this camera 1, the subject image that has passed a lens 2 installed on the camera 1 is visible through a finder 3. When a shutter button 4 is depressed, the subject image is exposed onto the film (not shown) that is loaded into the camera 1.

A liquid crystal display device 6 is provided on the top surface of the camera 1 to display various information relating to the camera 1. A data copying device 5 is positioned on the rear surface of the camera 1. This data copying device 5 has a display component 7 and a plurality of operating buttons 8.

The group of operating buttons 8 consists of five buttons: a function selection button 8a, a mode selection button 8b, a numerical value selection button 8c, a copying/non-copying switching button 8d, and a numerical value revision button 8e.

Figure 2:
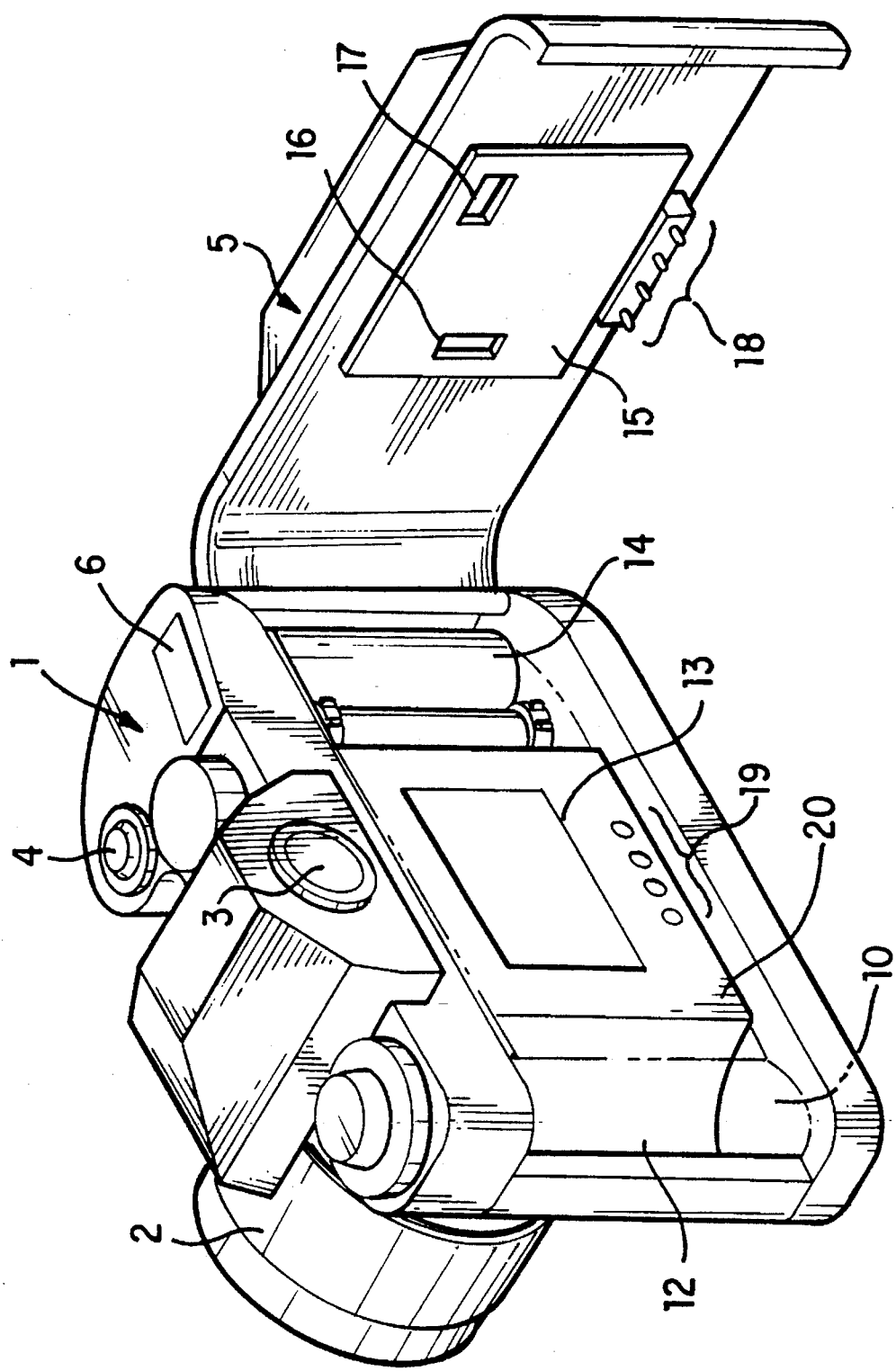
FIG. 2 is an oblique view showing the camera of FIG. 1 with the rear cover in an opened position.

FIG. 2 shows the data copying device of the camera in FIG. 1 in an opened condition. A film cartridge 10 is loaded into a film chamber 12, and as the film 20 is pulled out it passes over an aperture 13 and is wound up by a spool 14.

A pressure plate 15 is positioned on the inside of the data copying device 5 to force the film 20 into close contact with the aperture 13.

Openings 16 and 17 are provided in two places on the pressure plate 15. The data to be copied is projected to the rear surface of the film 20 via the openings 16 and 17 and optically recorded in two places on the film 20.

A copying signal that orders the copying action of the data copying device 5 is received through a plurality of contact points 19 and 18, which are provided outside the perimeter of the aperture 13 of the camera 1 and at the bottom of the pressure plate 15 of the data copying device 5, respectively.

Figure 3:
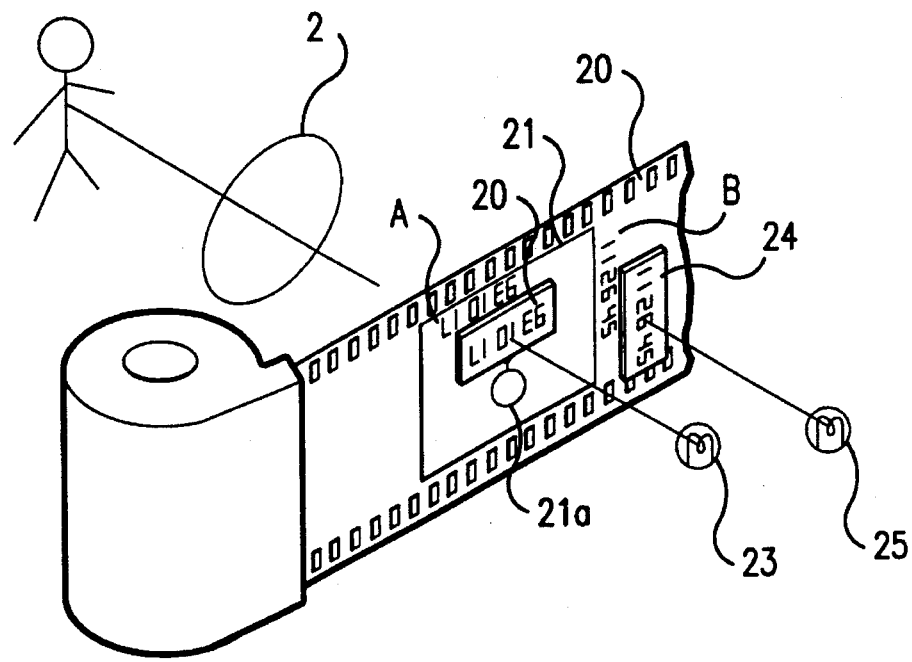
FIG. 3 is an explanatory drawing showing a principle by which data copying is carried out onto film.

FIG. 3 is an explanatory drawing showing a principle of copying data onto the film 20. The subject image 21a formed by the lens 2 of FIG. 1 is composed onto the film 20 and exposed within the photographic field 21.

Liquid crystal plates 22 and 24 and lamps 23 and 25 are positioned behind the film 20. By causing the lamps 23 and 25 to emit light only for a fixed time that depends upon the brightness of the lamps 23 and 25 and the sensitivity of the film 20, primary data A can be recorded inside the photographic field 21 and secondary data B can be copied outside the photographic field 21 from the rear surface of the film 20.

Liquid crystal plates 22 and 24 each have six units of seven-segment, permeable components. The necessary data is expressed by the permeable characters formed.

Figure 4:
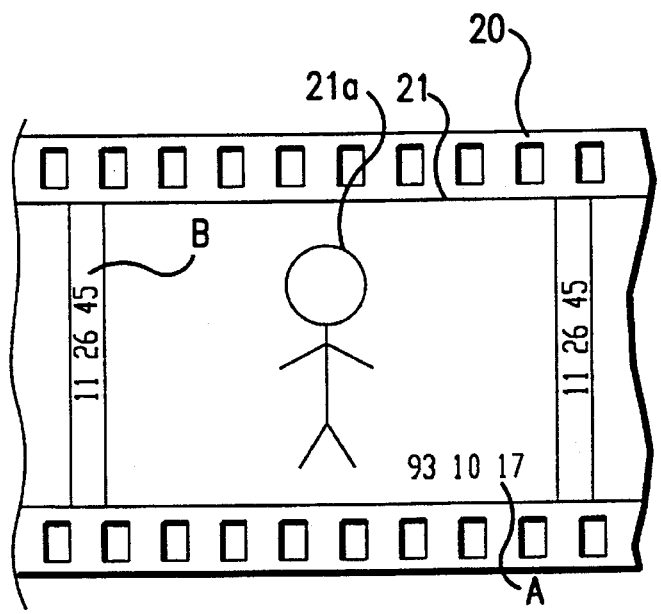
FIG. 4 is an explanatory drawing showing film on which horizontal photography has been performed with a camera set up in a horizontal position and on which data recording has been completed.

FIG. 4 shows an example of film 20 on which photography and data copying has been completed as described above. In this figure, the subject image 21a is placed in a straight-ahead direction.

In this example, characters "93 10 17", which indicate the date (1993, Oct. 17), are copied and recorded as primary data A, and characters "11 26 45", which show the time (11:26:45), are copied and recorded as secondary data B.

Data A is recorded so as to overlap the photographic field 21, while data B is recorded outside and adjacent to photographic field 21.

The orientation of the characters of data A and B in relation to a photographic field 21, which is photographed when the camera is set up in a horizontally oblong position, which is the normal position, is such that the tops of the characters of data A face upward and the tops of the characters of data B face toward the left as shown in FIG. 4.

Figure 5:
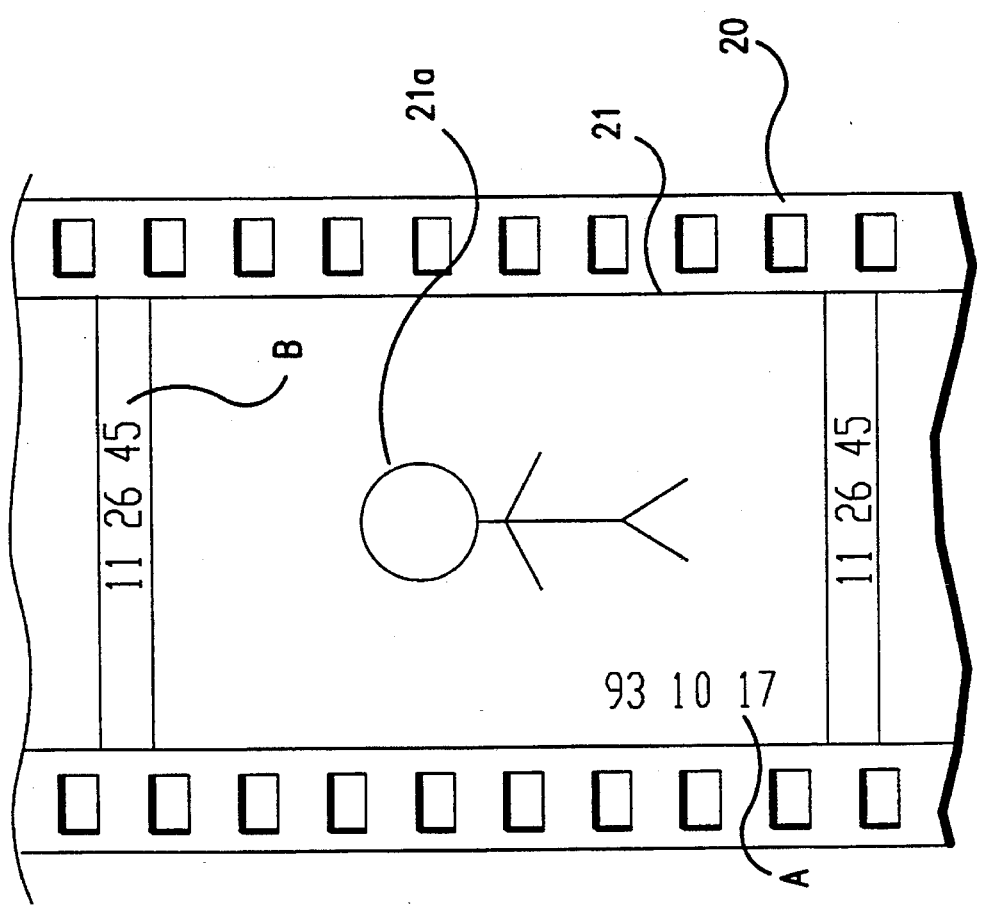
FIG. 5 is an explanatory drawing showing film on which vertical photography has been performed with the camera set up in a vertical position and on which data recording has been completed.

FIG. 5 shows an example of photographic film which has been photographed in a vertical position by setting up a camera so that the shutter button 4 is at the bottom, or in other words, so that the film 20 winding side is at the bottom in order to orient the photographic field in a vertically oblong position. The exemplary subject image 21a is again placed in the straight-ahead direction.

Data A and B are the same as in FIG. 4, but the orientation of the characters of data A and B, in relation to a photographic field 21 which is photographed when the camera is set up in the vertically oblong position, is such that the tops of the characters of data A face toward the right and the tops of the characters of data B face upward.

Figure 6:
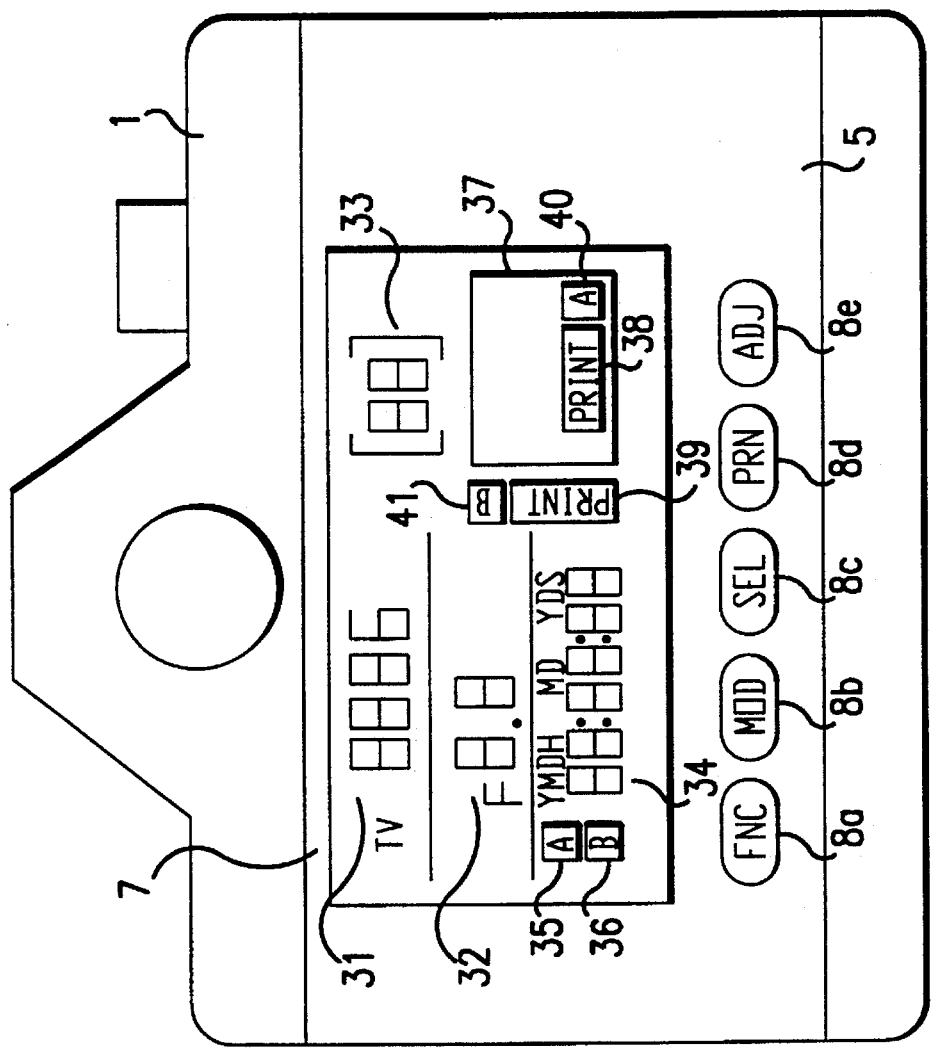
FIG. 6 is a plan view showing details of the display components of the data copying device of FIG. 1, which are all in an illuminated state, and of an operating button group.

FIG. 6 shows details of the display component 7 and the operating button group 8 of the data copying device 5 of FIG. 1. In this drawing, the display component 7 is shown with every element of the display in an illuminated condition.

A shutter second time display component 31, a stop value display component 32, and a film counter component 33 display the shutter time in seconds, the stop value, and the film count number of the camera, respectively.

Six-unit, seven-segment display components 34 are used to display the year/month/day, hour/minute/second, and the like as data A and B are copied within the photographic field 21.

The character groups that are positioned at the top of each pair of seven-segment display components 34 are to show the year (Y), month (M), day (D), hour (H), minute (M), and second (S).

An A mark 35 and a B mark 36 are used to distinguish whether the data displayed on the seven-segment display components 34 is data A or data B.

Field display component 37, print mark 38, print mark 39, A mark 40, and B mark 41 may each be illuminated individually, and form a recording position display that shows the position of data A and B relative to the photographic field 21.

Five operating buttons, in order from the left, are a function selection button 8a, a mode selection button 8b, a numerical value selection button 8c, a copying/non-copying switching button 8d, and a numerical value revision button 8e.

Figure 7:
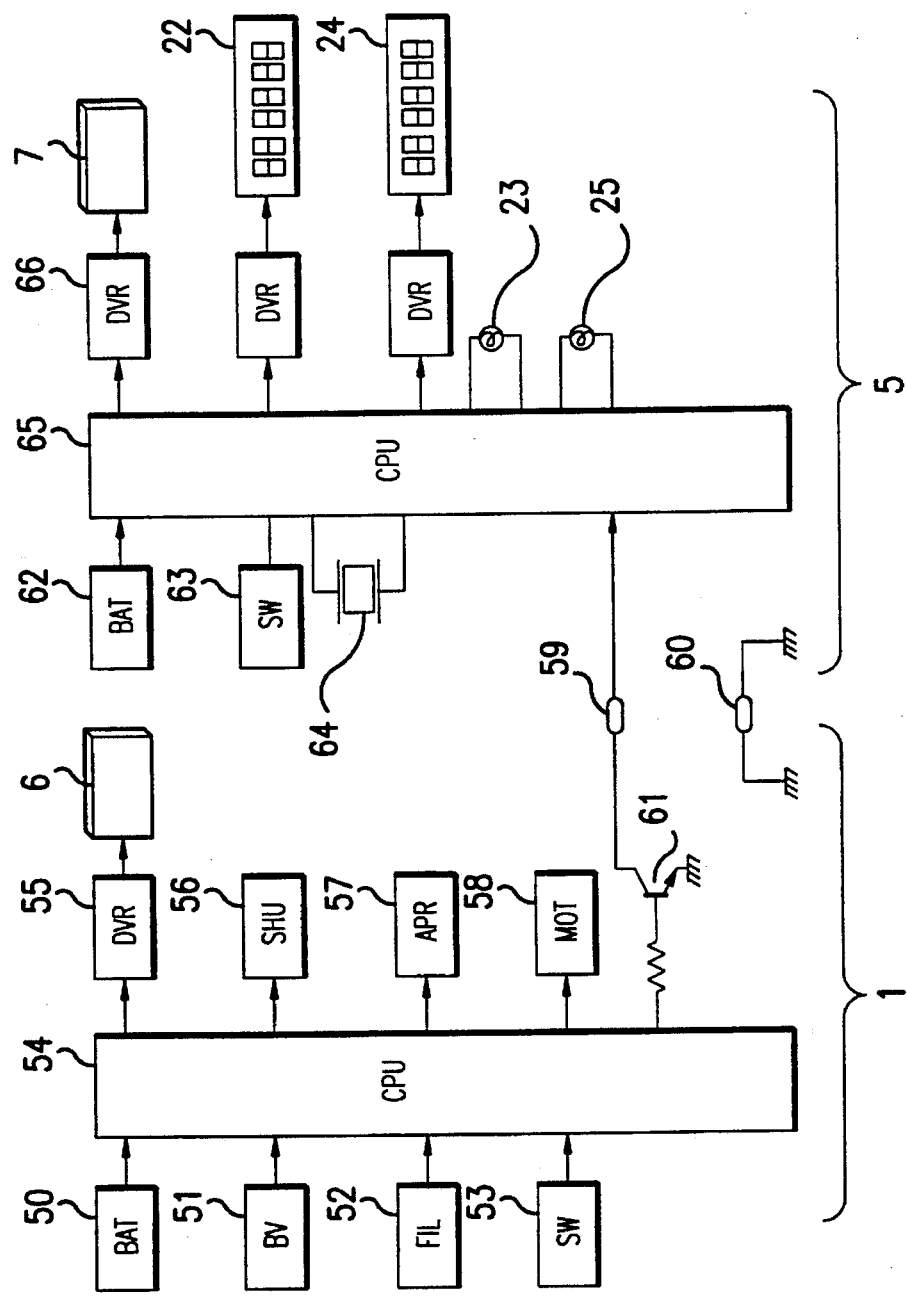
FIG. 7 is a wiring diagram showing electrical circuits of the camera of FIG. 1 and of the data copying device.

FIG. 7 is a block diagram of the electrical circuit of the data copying device 5 and the inside of the camera 1 shown in FIG. 1, in which the circuit to the left of contact points 59 and 60 corresponds to the camera 1, and the circuit to the right of the contact points 59 and 60 corresponds to the data copying device 5.

The circuit portion corresponding to the camera 1 is first described. The operation of the circuit of the camera 1 is carried out under the power of a battery 50.

The regulations of the camera 1 are all executed with a CPU 54 as the center. Using conventional means, a subject brilliance signal from a light measuring circuit 51, a film sensitivity signal from a film sensitivity detecting circuit 52, and a condition signal from a condition detecting circuit for various switches 53 are input to the CPU 54.

A power source switch and a release switch that are connected to the above-mentioned shutter button 4 are included in a switch detecting circuit 53.

The CPU 54 carries out the display of the exposure conditions through a liquid crystal display device 6 via a liquid crystal driver 55, the fixed time interval exposure through the opening and closing of a shutter 56, the regulation of the permeating light amount by changing the opening diameter of the diaphragm, and the winding up and rewinding of the film 20 by rotating a motor 58.

The CPU 54 also drives a transistor 61 and transmits a data copying signal to the data copying device 5 through contact point 59.

Contact point 60 is a ground level signal terminal, contact points 59 and 60 being the same as contact points 19 and 18 shown in FIG. 2.

The circuit of the data copying device 5 will next be described.

In this circuit, each component including a CPU 65 is powered by a battery 62.

The on or off condition of the above-mentioned plurality of operating buttons from a switch detecting circuit 63 is transmitted, and a data copying signal is transmitted via contact point 59.

The output of an oscillator 64 is transmitted to a CPU 65 and taken as the basis of the data calculation relating to the date/time.

The CPU 65 carries out the display of exposure conditions, date/time, and the like on a liquid crystal display device 7 via a liquid crystal driver 66.

The CPU 65 also illuminates lamps 23 and 25 through a data copying signal and executes copying from behind the liquid crystal plates 22 and 24, which form the necessary numerical data, by setting each segment to the appropriate state of permeability in advance via liquid crystal drivers 67 and 68.

Figure 8:
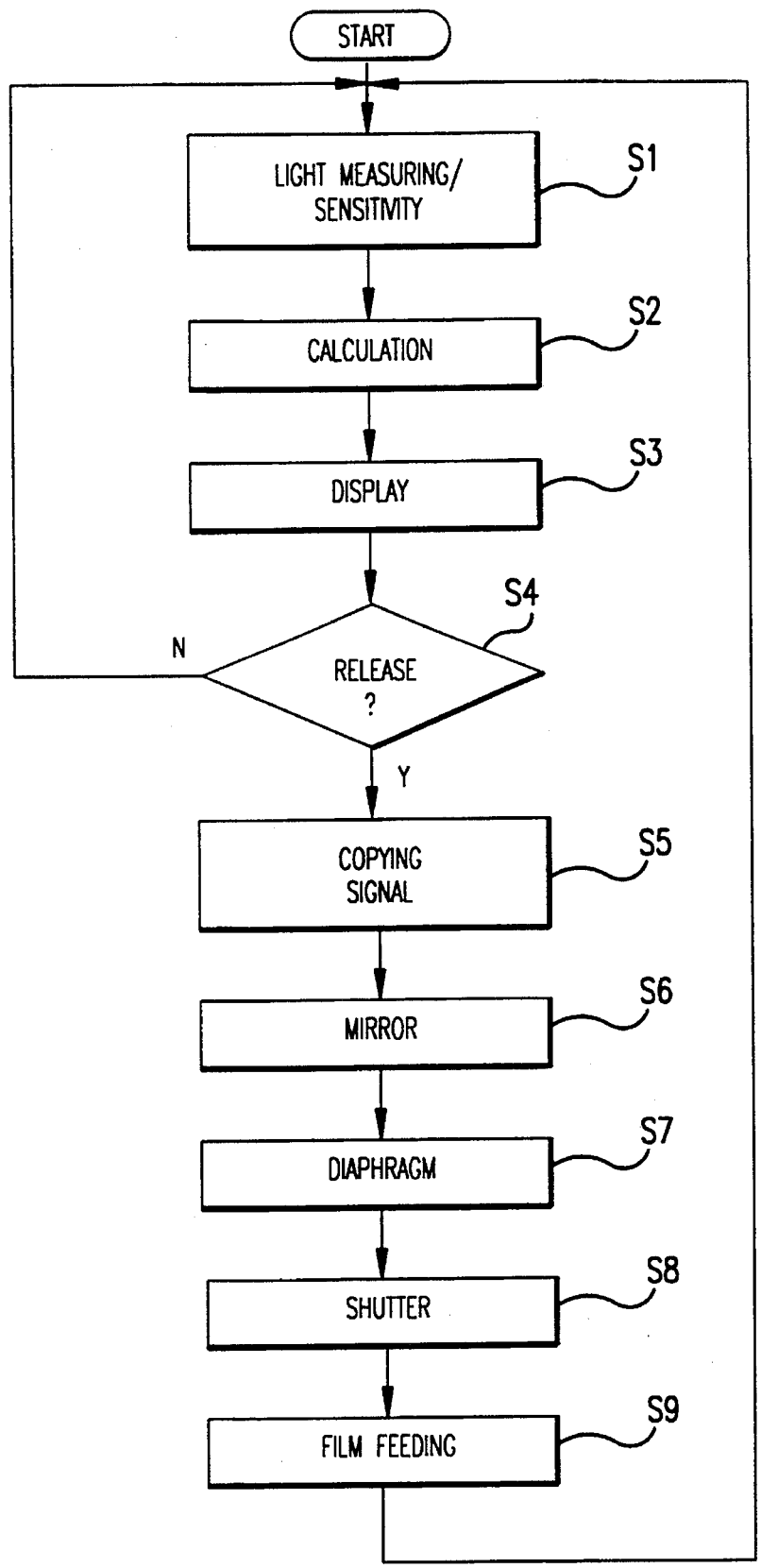
FIG. 8 is a flow chart showing an operating routine of a CPU in the camera of FIG. 7.

FIG. 8 shows the operating routine of the CPU 54 inside the camera 1 shown in FIG. 7, in which the operating routine is executed repeatedly while the CPU 54 is activated.

First, a light measuring signal and a sensitivity signal are taken in from the light measuring means 51 and the film sensitivity detecting means 52 (step S1).

Next, the signals are both calculated, and the proper exposure conditions such as shutter time and stop value are calculated (step S2).

The exposure conditions calculated above, the photography mode set by the switch condition detecting circuit 53, and the like, are next displayed on the display means 6 (step S3).

It is next determined via the switch condition detecting circuit 53 whether or not the shutter button 4 has been depressed (step S4). If the shutter button has not been depressed, the program returns to step S1 and repeats the procedure described above.

Conversely, if the shutter button 4 has been depressed, the transistor 61 is turned on for a fixed time interval and a data copying action is ordered from the data copying device 5 via contact point 59 (step S5).

A reflecting mirror (not shown) is raised and driven back by the photographic optical path (step S6).

A diaphragm 57 is next regulated so as to produce a fixed diaphragm opening (step S7).

The shutter 56 is then opened and closed, regulating the exposure of the film 20 (step S8).

Next, since the exposing action has been completed, the motor 58 is rotated and feeding of the film 20 and the driving action of the mechanism are carried out (step S9).

When one cycle of the exposing action has thus been carried out, the program returns to step S1 and the above procedure is repeated.

Figure 9:
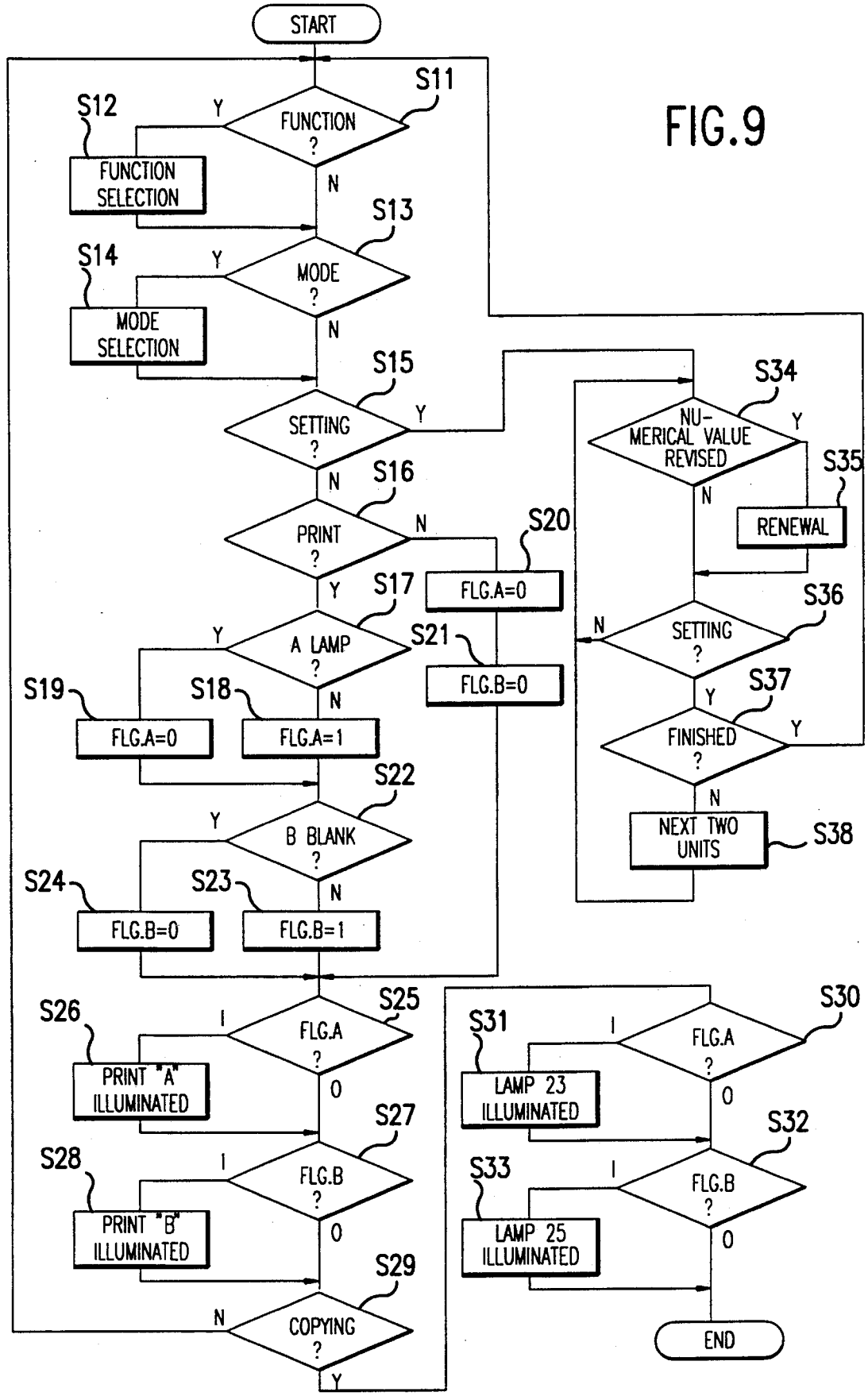
FIG. 9 is a flow chart showing an operating routine of a CPU in the copying device of FIG. 7.

FIG. 9 shows the operating routine of the CPU 65 in the copying device 5 of FIG. 7. This operating routine is carried out repeatedly while the CPU 65 is activated.

In order to facilitate the description of the operating routine, a description of the commonly known calendar function that calculates the output of the oscillator 64 and updates the time data is omitted.

First, it is determined whether or not the function selection button 8a has been depressed (S11).

If the button has been depressed, the copying function is selected (step S12).

Specifically, switching of the copying function of data A and of the copying function of data B is carried out, and the selected data A or B are displayed on the seven-segment display components 34. In addition, either the A mark 35 or the B mark 36, which corresponds to data A and B, is illuminated.

Conversely, if the function selection button 8a has not been depressed in step S11, or after step S12 has been completed, it is determined whether or not the mode selection button 8a has been depressed (step S13).

If the button 8a has been depressed, the copying modes for data A and B are selected (step S14).

There are seven types of copying modes for each data A and B: "year/month/date," "month/day/year," "day/month/year," "hour/minute/second," "fixed numerical value," "up count value," and "blank." Any of the types may be selected. The above-mentioned modes are successively renewed each time this step is passed, and one is selected.

This ordering is perpetual; the first function being selected after the last function.

Therefore, the user can select the desired copying mode by pushing the mode selection button 8b a fixed number of times.

Conversely, if the mode selection button 8b has not been depressed in step S13, or if step S14 has been completed, a determination is made as to whether or not the setting or revision of the numerical value data is possible (step S15).

Specifically, when the numerical value selection button 8c is depressed, it is possible to perpetually switch the six units of data on the seven-segment display components 34 between a normal condition i.e., a condition in which revision is not possible, a condition in which the top two units may be revised, a condition in which the middle two units may be revised, and a condition in which the bottom two units may be revised. If the numerical value selection button 8c is depressed in the normal condition and the top two units become revisable, the program diverges into step S34, which will be described hereafter.

Conversely, if the numerical value selection button 8c is not depressed, a determination is made as to whether or not copying setting has been carried out (step S16).

Specifically, when the copying/non-copying switching button 8d is depressed, switching is carried out between a copying state and a non-copying state. In the case of the non-copying state, the program diverges into step S20, which will be described hereafter.

In the copying state, it is determined whether or not data A is in the "blank" mode (step S17).

If the data is not in the "blank" mode, flag A is set to 1 (step S18).

Conversely, if the data is in the "blank" mode, flag A is set to 0 (step S19).

In the case of the non-copying state in step S16, flag A is set to 0 (step S20) and flag B is set to 0 (step S21).

After steps S18 and S19, a determination is made as to whether or not data B is in the "blank" mode (step S22).

If the data is not in the "blank" mode, flag B is set to 1 (step S23).

Conversely, in the case of the "blank" mode, flag B is set to 0 (step S24).

After steps S21, S23, and S24, flag A is evaluated (step S25).

When the flag is 1, the print mark 38 and the A mark 40 of the display component 7 are illuminated (step S26).

Conversely, if the flag is 0, or if step S26 has been completed, flag B is evaluated (step S27).

If flag B is 1, the print mark 39 and the B mark 41 are illuminated (step S28).

Conversely, if flag B is 0, or if step S28 has been completed, the contact point 59 is monitored and a determination is made as to whether or not a copying signal has been transmitted from the camera 1 (step S29).

If a signal has not been transmitted, the program returns to step S11.

If a signal has been transmitted, flag A is evaluated (step S30).

If flag A is 1, the lamp 23 used for data A is illuminated for a fixed time interval, and data A is copied (step S31).

If flag A is 0, or if step S31 has been completed, flag B is evaluated (step S32).

If flag B is 1, the lamp 25 used for copying data B is illuminated for a fixed time interval, data B is copied (step S33), and the operating routine ends.

If the numerical value selection button 8c is depressed in the normal state in step S15, when revision of the top two units of the seven-segment display components 34 is made possible, a determination is made as to whether or not the numerical value revision button 8e has been depressed (step S34).

If it is determined that the button has been depressed, 1 is added to the blinking display that is currently revisable, thus renewing the numerical value (step S35).

Conversely, if the button has not been depressed or if step S35 has been completed, a determination is made as to whether or not the numerical value selection button 8c has been depressed (step S36).

If the button 8c has not been depressed, the program returns to step S34.

If the button 8c has been depressed, the numerical value of the two units to that point is determined, and a determination is made as to whether or not the numerical value of any two units of the six-unit data can be revised (step S37).

When the numerical value selection button is depressed and has returned to the normal state (state in which revision is not possible), revision is considered to be completed and the program returns to step S11.

If revision has not been completed, the two units in which revision has heretofore been possible are changed from a blinking display to a constantly illuminated state and the next two units are changed to a blinking state and can be revised (step S38). The program then returns to step S34 and repeats the actions described above.

The numerical value setting and revision action portions of the operating routine described above are described in detail below with reference to the actual operating button group 8.

The displayed numerical values differ according to the copying mode selected during the setting and revision action, but the basic setting action is the same.

The copying function can be switched by depressing the function selection button 8a. Either the copying function of data A or the copying function of data B is selected.

The selected data A or B is displayed on the seven-segment display components 34.

In addition, either the A mark 35, which corresponds to data A, or the B mark 36, which correspond to data B, is illuminated.

In all cases except the "blank" mode, when the numerical value selection button 8c in the normal state is switched from the depressed state to a state in which revision is possible, the top two units of the six units of displayed numerical values change to a blinking state, indicating that revision is possible.

In this state, if the numerical value revision button 8e is depressed the current numerical value will be increased by 1.

Therefore, it is possible to set the desired numerical value by depressing the button 8e an arbitrary number of times until the desired result is achieved.

After the desired numerical value has been set, the top two units which have just been revised are changed from a blinking state to a steady state by depressing the numerical value selection button 8c, and the middle two units begin to blink.

These numerical values may also be set to the desired numerical values by depressing the numerical value revision button 8e the appropriate number of times.

The bottom two units are set to the desired numerical values in the same manner.

After the desired numerical values have all been set through the operations described above, the display is changed from the revisable state to the normal state by depressing the numerical value selection switch 8c again. The entire display then returns to a steady illuminated state.

The display of functions among the copying functions that relate to time, namely "year/month/day," "month/day/year," "day/month/year," and "hour/minute/second," is renewed by the output of a timer circuit (not shown) that uses a built-in oscillator 84, and is constructed so that the current date or time is always displayed.

In addition, the "fixed numerical value" function displays arbitrarily set numerical values of the six units just as they have been set, and the "up count value" function is constructed so that 1 is added to the internal counter (not shown) according to the input of a copying signal produced through the photographing of one frame, after which the resulting value is displayed.

Furthermore, the copying/non-copying switching button 8d determines whether or not these numerical values will be copied, and is not related to the copying mode selection. Each time this button is pushed the copying and non-copying states are switched.

The actual copying action will next be described in detail.

Figure 10:
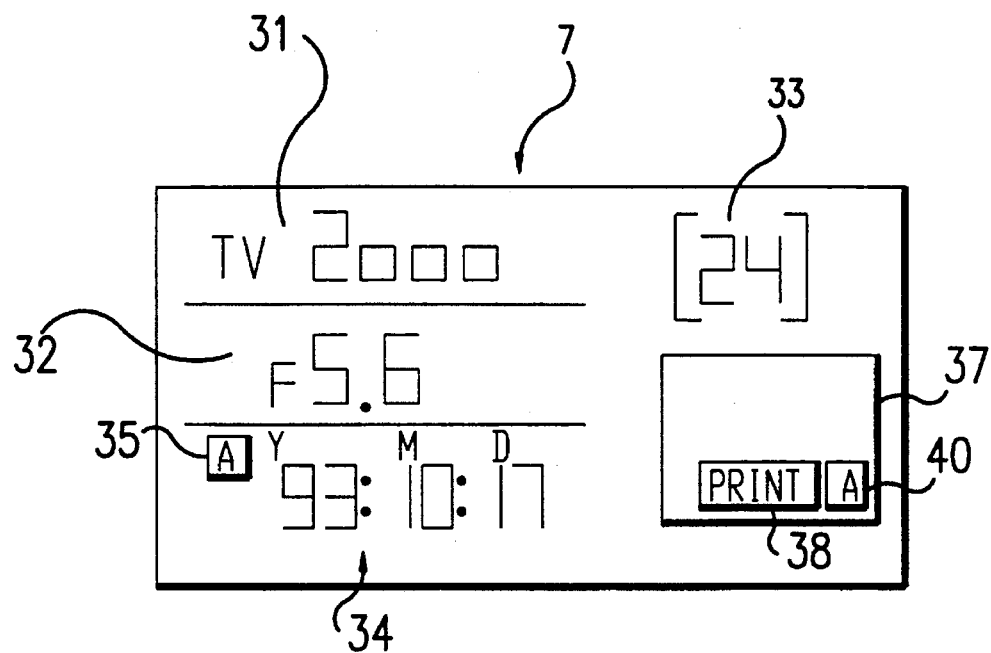
FIG. 10 is an explanatory drawing showing an example of a display in which only data A is copied by the data copying device of FIG. 6.

First, a case in which only data A is copied will be described using FIG. 10.

Copying is set to the data A function by the function selection button 8a.

In this state, the copying mode is selected by depressing the mode selection button a fixed number of times.

With this embodiment, the "year/month/day" mode has been selected.

As described above, the desired data revision is carried out through the operation of the numerical value selection button 8c and the numerical value revision button 8e.

With this embodiment, the numerical value setting is such that "93 10 17" will be copied as the year/month/day.

The copying function is set to the data B copying function by depressing the function selection button again, and the data B function is set to the "blank" mode by depressing the mode selection button 8b a fixed number of times.

By depressing the function selection button 8a once more, the seven-segment display components 34 are made to display the data A.

After the operations described above, the copying/non-copying switching button 8d is operated, setting the device to the copying state.

At this point, according to the operating routine, since flag A is 1 and flag B is 0, the print mark 38 and the A mark 40 of the display component 7 are illuminated but the print mark 39 and the B mark 41 are not illuminated.

Thus, by looking at this display when photography is to be performed, the photographer can instantly know that the year/month/day data will be copied at the right lower position within the photographic field 21.

When photography is performed, only the lamp 23 that is used for the copying data A shown in FIG. 3 is illuminated by a copying signal input from the camera 1, and the copying of data A onto the film 20 is carried out.

Figure 11:
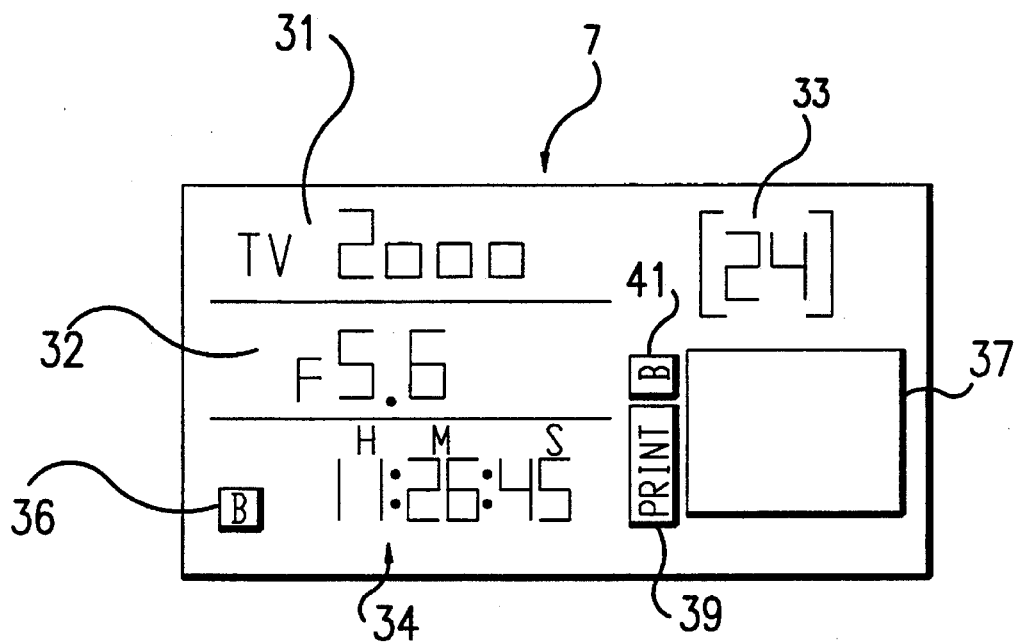
FIG. 11 is an explanatory drawing showing an example of a display in which only data B is copied by the data copying device of FIG. 6.

The case in which only data B is copied will next be described using FIG. 11.

Copying is set to the copying data B function by the function selection button 8a.

In this state, the copying mode is selected by depressing the mode selection button 8b a fixed number of times.

With this embodiment, the "hour/minute/second" mode has been selected.

Desired data revision is carried out through the operation of the numerical value selection button 8c and the numerical value revision button 8e, as described above.

With this embodiment, the numerical values have been set so that "11 26 45" will be copied, showing the hour/minute/second.

Copying is set to a copying data A function by depressing the function selection button 8a again, and the copying data A function is set to the "blank" mode by depressing the mode selection button 8b a fixed number of times.

By depressing the function selection button 8a once more, the seven-segment display components 34 are made to display the data B.

After the operations described above, the copying/non-copying switching button 8d is operated, and the device is set to the copying state.

At this point, according to the operating routine, since flag A is 0 and flag B is 1, the print mark 39 and the B mark 41 of the display component 7 are illuminated but the print mark 38 and the A mark 40 are not illuminated.

Thus, by looking at the display when photography is to be performed, the photographer can instantly know that the year/month/day data will be copied at the left side position outside the photographic field 21.

In particular, when vertical photography is performed, since the orientation of the characters relative to the photographic field 21 is known, it can be easily comprehended that the copied characters can be recorded with the correct orientation by setting up the camera 1 and performing photography in such a manner that the shutter button 4 is at the bottom (or so that the film winding side is at the bottom).

When photography is performed, only the lamp 25 that is used for copying data B is illuminated by a copying signal input from the camera 1, and the copying of data B onto the film 20 is carried out.

Figure 12:
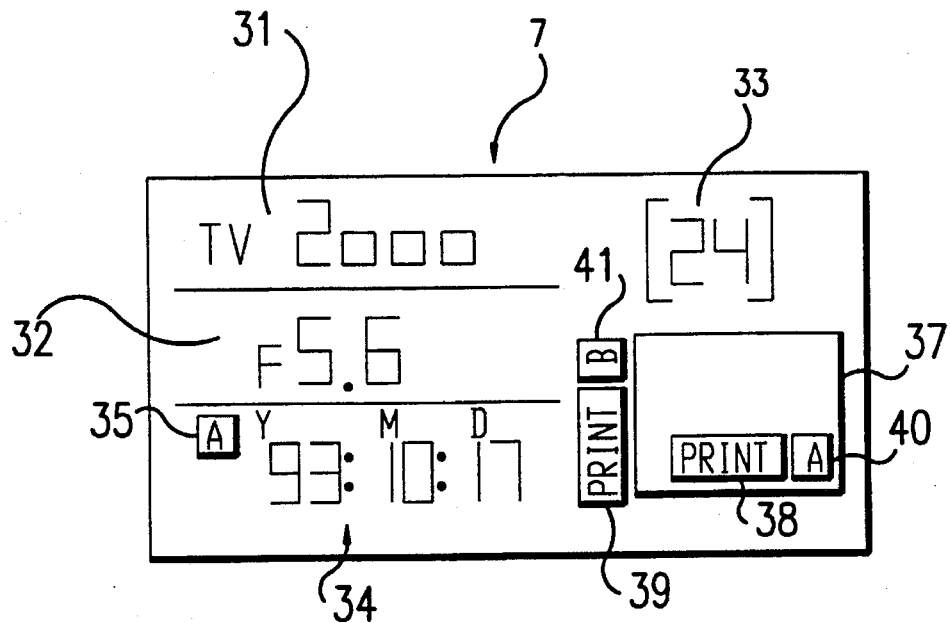
FIG. 12 is an explanatory drawing showing an example of a display in which both data A and B are copied by the data copying device of FIG. 6.
Figure 13:
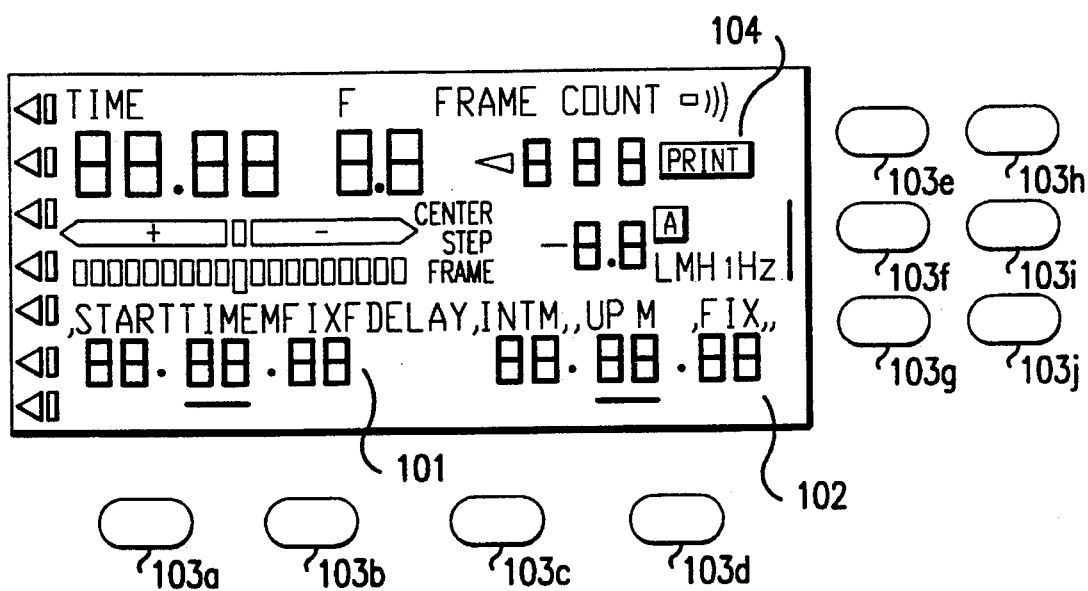
FIG. 13 is an explanatory drawing showing a display and operating buttons of a prior art conventional data copying device.

Finally, a case in which both data A and B are copied will be described using FIG. 12.

Copying is set to a data A function by the function selection button 8a.

In this state, the copying mode is selected by depressing the mode selection button 8b a fixed number of times.

With this embodiment, the "year/month/day" mode has been selected.

The data revision is carried out through the operation of the numerical value selection button 8c and the numerical value revision button 8e as described above.

With this embodiment, the numerical value setting is such that "93 10 17" will be copied as the year/month/day.

In the same way, copying is set to a data B function by the function selection button 8a.

In this state, the copying mode is selected by depressing the mode selection button 8b a fixed number of times.

With this embodiment, the "hour/minute/second" mode has been selected.

The desired data revision is carried out as described above through the operation of the numerical value selection button 8c and the numerical value revision button 8e.

With this embodiment, the numerical value setting is such that "11 26 45" will be copied as the hour/minute/second.

After the operations described above, the copying/non-copying switching button 8d is operated and the device is set to the copying state.

At this point, according to the operating routine, since flag A is 1 and flag B is 1, the print mark 39, the B mark 41, the print mark 38, and the A mark 40 are all illuminated.

Thus, by looking at this display when photography is to be performed, it can be instantly known that the year/month/ day data will be copied at the lower right inside the photographic field 21 and that the hour/minute/second data will be copied at the left side position outside the photographic field 21.

When photography is performed, the lamp 23 used for copying data A and the lamp 25 used for copying data B are both illuminated because of the input of copying signals from the camera 1, and the copying of data A and B onto the film 20 is carried out.

With the data copying device for a camera described above, since the recording positions of data A and B which are copied to the photographic field 21 are indicated by the print mark 38, the A mark 40, the print mark 39, and the B mark 41, which roughly correspond to the positions in the photographic field 21, the recorded positions of data A and B relative to the photographic field can be quickly and reliably determined by viewing the displays. In addition, it can easily be distinguished which data is in the copying state, and as a result, confusion at the time of photography can be reliably eliminated.

In addition, with the data copying device for a camera described above, since the orientations of the characters of data A and B that are copied to the photographic field 21 are indicated by the print mark 38, the A mark 40, the print mark 39, and the B mark 41, the orientation of the characters of copying data A and B can be quickly and reliably determined by viewing these displays. In particular, when photography in the vertical position is performed, the photographer can be alerted to considerations that need to be made for vertical position photography so that correct character orientation is obtained relative to the true position of the subject image. In the described embodiment, the photographer would know that for proper vertical photography, the camera should be arranged so that the print mark 39 is below display component 37.

With the embodiments described above, construction is such that when only copying of data A is accomplished, data B is not displayed on the seven-segment display components 34. Conversely, when only copying of data B is accomplished, the construction may be such that data A is not displayed on the seven-segment display components 34.

With the data copying device for a camera according to an embodiment of the invention, since the recorded positions of primary and secondary data on a photographic field are displayed by primary and secondary recording position display components which roughly correspond to positions on the photographic field, the recorded positions of the primary and secondary data on the photographic field can be quickly and reliably known by viewing the primary and secondary recording position display components. In addition, it can be easily distinguished which data is in the copying state.

With the data copying device for a camera according to another embodiment of the invention since the character orientation of primary and secondary data copied to the photographic field is indicated by primary and secondary recording direction display components of display means, character orientations of the primary and secondary data can be quickly and reliably known by viewing the display means. In particular, when photography in the vertical position is performed, a photographer can be alerted to considerations that need to be made for vertical position photography so that correct character orientation is obtained relative to the true position of the subject image.

What is claimed is:

1. A data copying device for a camera, comprising:

primary recording means for recording primary data within a photographic field or in the vicinity of the photographic field of film in said camera;

secondary recording means for recording secondary data within the photographic field or in the vicinity of the photographic field of the film in said camera, in a different position and orientation from a recorded position and orientation of the primary data;

externally visible display means positioned on an exterior of the camera, the display means comprising a photographic field display component having a form roughly corresponding to the photographic field, and primary and secondary recording position display components positioned and oriented relative to the photographic field display component to show the recorded position and orientation of the primary and secondary data, respectively, with respect to the photographic field.

2. The data copying device according to claim 1, wherein:

said secondary recording means records data in the vicinity of a photographic field upon a film in a direction perpendicular to a feeding direction of the film; and said secondary recording position display component is located relative to said photographic field display component at a position and orientation corresponding to the position and orientation of the secondary recording means relative to the photographic field.

3. The data copying device according to claim 1 wherein the primary and secondary recording means comprise liquid crystal plates.

4. The data copying device according to claim 3 wherein each liquid crystal plate comprises a permeable six-unit, seven segment display.

5. A data copying device, comprising:

recording means for recording data in a plurality of positions in the vicinity of a photographic field upon a film, the recorded data in at least two of the plurality of positions having different orientations; and externally visible display means, the display means comprising a photographic field display component having a form roughly corresponding to the photographic field and a plurality of recording position display components positioned and oriented relative to said photographic field display component at locations that correspond, positionally and orientationally, to the plurality of recording positions relative to the photographic field.

6. The data copying device according to claim 5 wherein said recording means includes a liquid crystal plate.

7. The data copying device according to claim 6 wherein said liquid crystal plate comprises a permeable six-unit, seven segment display.

8. A data copying device for a camera, comprising:

a primary recording device that records primary data within a photographic field or in the vicinity of the photographic field of film in said camera;

a secondary recording device that records secondary data within the photographic field or in the vicinity of the photographic field of the film in said camera, in a different position and orientation from a recorded position of the primary data;

an externally visible display, positioned on an exterior of the camera, said display comprising a photographic field portion having a shape similar to the photographic field of the film, a primary recording position display component located at a position relative to said photographic field portion that is similar to a position and orientation of said primary recording device relative to the photographic field of the film, and a secondary recording position display component located at a position and orientation relative to said photographic field portion that is similar to a position and orientation of said secondary recording device relative to the photographic field of the film.

9. The data copying device according to claim 8, wherein:

said secondary recording device is positioned relative to the photographic field of the film to record data in the vicinity of the photographic field of the film in a direction perpendicular to a feeding direction of the film; and said secondary recording position display component is located in the vicinity of the photographic field portion, and also extends in said direction perpendicular to the feeding direction of the film.

10. The data copying device according to claim 8, wherein the primary and secondary recording devices comprise liquid crystal plates.

11. The data copying device according to claim 10, wherein each liquid crystal plate comprises a permeable, six-unit, seven segment display.

12. The data copying device according to claim 8, wherein said primary recording position display component and said secondary recording position display component each display indicia.

13. A data copying device for a camera, comprising:

a recording device that records data in a plurality of recording positions relative to a photographic field of film in said camera, the recorded data in at least two of the plurality of recording positions having different orientations; and an externally visible display positioned on an exterior of the camera, the display comprising:

a photographic field display portion having a shape similar to the shape of the photographic field of the film, and a plurality of recording position display components positioned and oriented relative to said photographic field display portion at locations that correspond, positionally and orientationally, to the plurality of recording positions relative to said photographic field of the film.

14. The data copying device of claim 13, wherein said plurality of recording position display components each display indicia having an orientation similar to an orientation of the data recorded on the film in a corresponding one of said plurality of recording positions.

15. A data copying device for a camera, comprising:

a primary recording device that records primary data within a photographic field or in the vicinity of the photographic field of film in said camera;

a secondary recording device that records secondary data within the photographic field or in the vicinity of the photographic field of the film in said camera, in a different position and orientation from a recorded position of the primary data; and an externally visible display positioned on an exterior of the camera, the display comprising:

a photographic field display component having a shape similar to a shape of the photographic field of the film, and primary and secondary recording position display components each of which displays indicia having an orientation similar to an orientation of the data recorded on the film by said primary recording device and said secondary recording device, respectively.

16. A data copying device for a camera, comprising:

a recording device that records data in a plurality of recording positions relative to a photographic field of film in said camera, the recorded data in at least two of the plurality of recording positions having different orientations; and an externally visible display positioned on an exterior of the camera, the display comprising:

a photographic field display portion having a shape similar to the shape of the photographic field of the film, and a plurality of recording position display components each of which displays indicia having an orientation similar to an orientation of the data recorded on the film in a corresponding one of said plurality of recording positions.

17. A data copying device for a camera, comprising:

primary recording means for recording primary data within a photographic field or in the vicinity of the photographic field of film in the camera, the primary recorded data extending in a direction parallel to a direction of film feed;

secondary recording means for recording secondary data within the photographic field or in the vicinity of the photographic field of the film in the camera, in a different position and orientation from the recorded position of the primary data, the second recorded data extending in a direction perpendicular to the direction of feed film; and externally visible display means positioned on an exterior of the camera, the display means comprising:

a photographic field display component having a form roughly corresponding to the photographic field;

a primary recording position display component positioned and oriented relative to the photographic field display component to show the position and orientation of the primary recorded data relative to the photographic field; and a secondary recording position display component positioned and oriented relative to the photographic field display component to show the position and orientation of the secondary recorded data relative to the photographic field.

18. A data copying device for a camera, comprising:

primary recording means for recording primary data within a photographic field or in the vicinity of the photographic field of film in the camera, the primary recorded data extending in a direction parallel to a direction of film feed;

secondary recording means for recording secondary data within the photographic field or in the vicinity of the photographic field of film in the camera, in a different position and orientation from a recorded position of the primary data, the secondary recorded data extending in a direction perpendicular to the direction of the film feed; and externally visible display means positioned on an exterior of the camera, the display means comprising:

a photographic field display component having a form roughly corresponding to the photographic field;

a primary recording position display component which displays indicia positioned and oriented relative to the photographic field display component to show the position and orientation of the primary recorded data relative to the photographic field; and a secondary recording position display component which displays indicia positioned and oriented relative to the photographic field display component to show the position and orientation of the secondary recorded data relative to the photographic field.

* * * * *